US006714498B2

(12) United States Patent
Komma et al.

(10) Patent No.: US 6,714,498 B2
(45) Date of Patent: Mar. 30, 2004

(54) INFORMATION RECORDING/ REPRODUCING APPARATUS

(75) Inventors: Yoshiaki Komma, Hirakata (JP); Shin-ichi Tanaka, Kyotanabe (JP); Tetsuo Saimi, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/402,469

(22) Filed: Mar. 28, 2003

(65) Prior Publication Data

US 2003/0169663 A1 Sep. 11, 2003

Related U.S. Application Data

(62) Division of application No. 09/336,937, filed on Jun. 21, 1999, now Pat. No. 6,567,358.

(30) Foreign Application Priority Data

Jun. 26, 1998 (JP) .......................................... 10-180112

(51) Int. Cl.⁷ ................................................ G11B 5/09
(52) U.S. Cl. ...................................................... 369/53.21
(58) Field of Search ............................. 369/53.2, 53.21, 369/53.22, 53.37, 75.1, 75.2, 77.1, 77.2, 79, 187; 360/99.02, 99.06

(56) References Cited

U.S. PATENT DOCUMENTS

| 4,620,249 | A | * | 10/1986 | Suzaki et al. ............. 360/99.02 |
| 4,979,210 | A |   | 12/1990 | Nagata et al. |
| 5,073,925 | A |   | 12/1991 | Nagata et al. |
| 5,136,570 | A | * | 8/1992  | Takai et al. ................. 369/77.1 |
| 5,331,423 | A | * | 7/1994  | Ota et al. ................. 360/99.06 |
| 5,341,357 | A | * | 8/1994  | Mukawa et al. ............ 369/75.2 |
| 5,392,351 | A |   | 2/1995  | Hasebe et al. |
| 5,513,260 | A |   | 4/1996  | Ryan |
| 5,579,120 | A |   | 11/1996 | Oguro |
| 5,659,613 | A |   | 8/1997  | Copeland et al. |
| 5,699,370 | A |   | 12/1997 | Kaniwa et al. |
| 5,748,575 | A |   | 5/1998  | Lee |
| 5,757,749 | A |   | 5/1998  | Misawa |
| 5,764,607 | A |   | 6/1998  | Maeda et al. |
| 6,134,201 | A |   | 10/2000 | Sako et al. |
| 6,243,347 | B1 | * | 6/2001 | Kawana et al. ............. 369/77.1 |
| 6,331,969 | B1 |   | 12/2001 | Kobayashi et al. |
| 6,467,026 | B2 | * | 10/2002 | Yamamoto et al. ......... 711/118 |

* cited by examiner

*Primary Examiner*—Thang V. Tran
(74) *Attorney, Agent, or Firm*—Merchant & Gould, P.C.

(57) ABSTRACT

An information recording/reproducing apparatus determines whether ejection of an optical disk stored in an optical disk drive or in a changer is allowed when receiving a command for ejecting the optical disk to the outside. The information recording/reproducing apparatus allows the optical disk to be ejected only when judging that the ejection is allowed. When judging that the ejection is not allowed, the information recording/reproducing apparatus rejects the ejection. Prohibition of ejection of an optical disk on which information whose copyright is to be protected has been recorded enables the use of the information for private hobby and at the same time prevents pirated versions or the like from being produced, thus realizing copyright protection.

19 Claims, 8 Drawing Sheets

Variation of conditions for allowing ejection

| 1. | Not a recordable disk |
|---|---|
| 2. | Finding no history indicating that information has been recorded on the disk in this apparatus |
| 3. | Finding no history indicating that information that is restricted to be copied has been recorded on the disk in this apparatus |

Variation of conditions for allowing ejection

| 1. | Not a recordable disk |
|---|---|
| 2. | Finding no history indicating that information has been recorded on the disk in this apparatus |
| 3. | Finding no history indicating that information that is restricted to be copied has been recorded on the disk in this apparatus |

INFORMATION RECORDING/REPRODUCING APPARATUS

FIELD OF THE INVENTION

The present invention relates to an information recording/reproducing apparatus such as an optical disk apparatus that records information to be stored on, or reproduces or erases information from an optical medium or a magneto-optical medium (an information medium) such as an optical disk. Particularly, the present invention relates to an information recording/reproducing apparatus in which information is recorded on, or reproduced or erased from a portable information medium.

BACKGROUND OF THE INVENTION

The optical memory technique using an optical disk with a pit-shaped pattern as a high-density and mass storage medium has been put into practical use while expanding its application range to a digital audio disk, a video disk, a document file disk, and further a data file. Particularly, optical disks on which information can be recorded with high density, such as DVD-RAM, have been merchandised in recent years. Thus, easy recording of mass digital data on an optical disk has been realized gradually.

Digital data can be copied without any deterioration in its quality, which is an excellent feature. However, because of the excellent feature copyright protection becomes an indispensable condition.

Some proposals for protecting copyright already have been made. For example, a conventional example is disclosed in Publication of Unexamined Japanese Patent Application (Tokkai-Hei) No. 7-21987. It is the object of the conventional example to prevent creative works from being changed and published without authorization. In a system disclosed in the Publication, when information has been recorded on an optical disk by copying or changing a part of original information, the optical disk cannot be ejected from a recording apparatus before the recorded information is erased.

In the aforementioned conventional example, it is possible to prevent creative works from being changed and then published without authorization. However, the production of so-called pirated versions by copying the entire creative work without any change cannot be prevented. In addition, it also is not possible to copy or change a part of an existing creative works to make use of it for the purpose of personal hobby, which has been a problem.

BRIEF DESCRIPTION OF THE INVENTION

The present invention seeks to solve the above-mentioned problems. It is an object of the present invention to provide an information recording/reproducing apparatus that provides copyright protection by preventing the production of pirated versions or the like while enabling information to be recorded for the purpose of personal hobby.

In order to attain the aforementioned object, the present invention employs the following configurations.

An information recording/reproducing apparatus according to a first configuration of the present invention records information on an information medium. The information recording/reproducing apparatus determines whether the information medium may be unloaded when receiving a command for unloading it to the outside. The information recording/reproducing apparatus allows the information medium to be unloaded only when judging that the unloading is allowed and rejects the unloading of the information medium when judging that the unloading is not allowed.

An information recording/reproducing apparatus according to a second configuration of the present invention records information on an information medium. When information whose copyright must be protected is recorded on the information medium, the information recording/reproducing apparatus also records apparatus information for specifying the information recording/reproducing apparatus on the information medium.

An information recording/reproducing apparatus according to a third configuration of the present invention records information on an information medium. When information whose copyright must be protected is recorded on the information medium, the information recording/reproducing apparatus also records regional information for specifying the place (region) where the information is recorded on the information medium.

Thus, the above-mentioned respective configurations provide an information recording/reproducing apparatus with a simple configuration that enables copyright protection and personal use of information whose copyright must be protected to be compatible.

DETAILED DESCRIPTION OF THE INVENTION

Embodiments of the present invention will be explained with reference to the drawings as follows.

Figure 1:
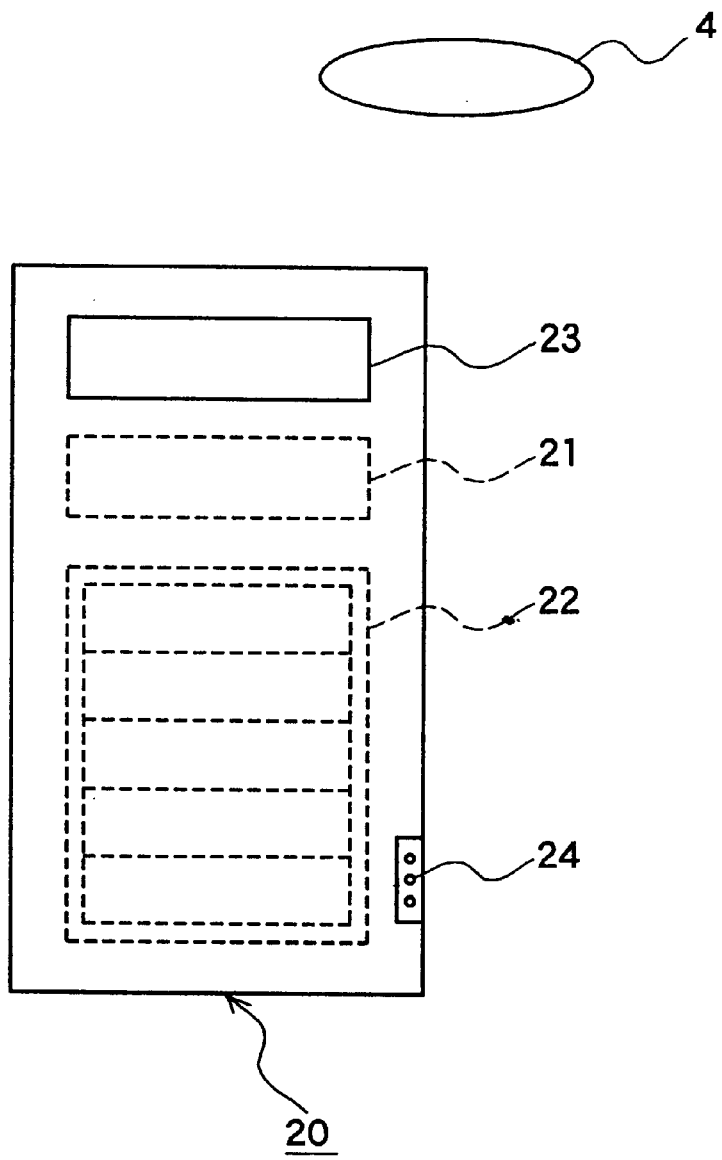
FIG. 1 is a conceptual structural view of an example of an optical disk apparatus according to embodiments of the present invention.

FIG. 1 is a conceptual structural view of an example of an optical disk apparatus according to the present invention.

When an optical disk 4 is inserted into an opening 23 for inserting and ejecting (unloading) an optical disk in an optical disk apparatus 20, the optical disk 4 is carried to an optical disk drive 21 and information is recorded on, reproduced from, or erased from the optical disk 4. Further, the optical disk 4 is carried to a changer 22 from the optical disk drive 21 and is stored therein based on a command for exchanging or storing the optical disk 4 by the operation of a switch for exchanging disks or a remote control, which is not shown in the figure. The changer 22 stores a plurality of optical disks. The changer 22 delivers the optical disk 4 to the optical disk drive 21 or stores the optical disk 4 delivered from the optical disk drive 21. The optical disk apparatus may have a configuration in which the optical disk 4 is transported directly between the changer 22 and the opening 23. By providing an information signal input/output part 24 for exchanging information with an external unit, various information can be recorded on the optical disk 4 to be utilized.

Figure 2:
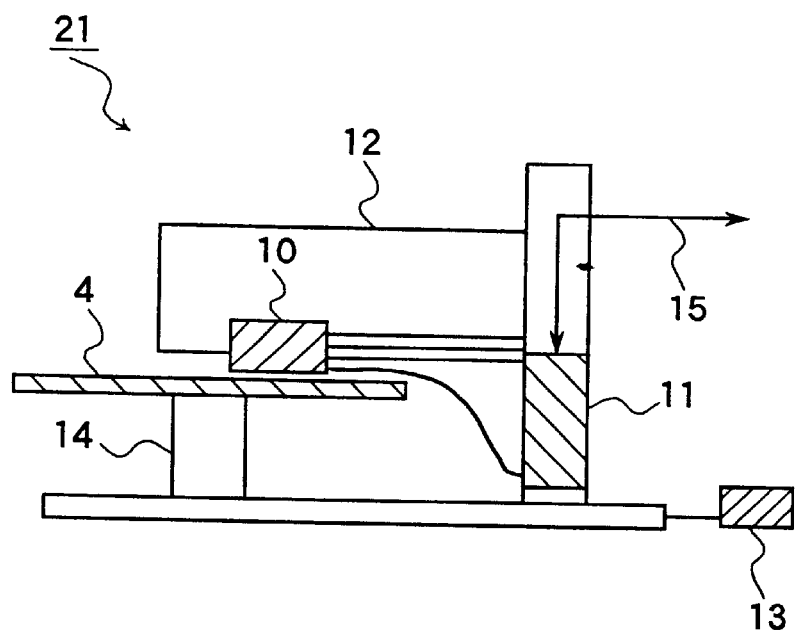
FIG. 2 is a conceptual structural view of an optical disk drive in the optical disk apparatus in FIG. 1.

FIG. 2 is a conceptual structural view of an example of the optical disk drive 21 explained with reference to FIG. 1. The optical disk 4 is rotated by a driving mechanism 14. An optical head device 10 is moved to the general area of a desired track on the optical disk 4 by a system 12 for driving the optical head device 10. The optical head device 10 also sends a focus error signal or a tracking error signal to an electric circuit 11 corresponding to the relative position relationship with the optical disk 4. Corresponding to this signal, the electric circuit 11 sends a signal for slightly moving an objective to the optical head device 10. According to this signal, the optical head device 10 operates a focus servo and a tracking servo for the optical disk 4, thus reading out information from, writing in information on, or erasing information from the optical disk 4. In the figure, numeral 13 indicates a power source inside the optical disk apparatus 20 or a connection with an external power source, and numeral 15 denotes a wire connecting the electric circuit 11 and an electric circuit in the optical disk apparatus 20.

Embodiments of the information recording/reproducing apparatus according to the present invention will be explained concretely as follows using the optical disk apparatus shown in FIGS. 1 and 2 as an example.

Embodiment I

Figure 3:
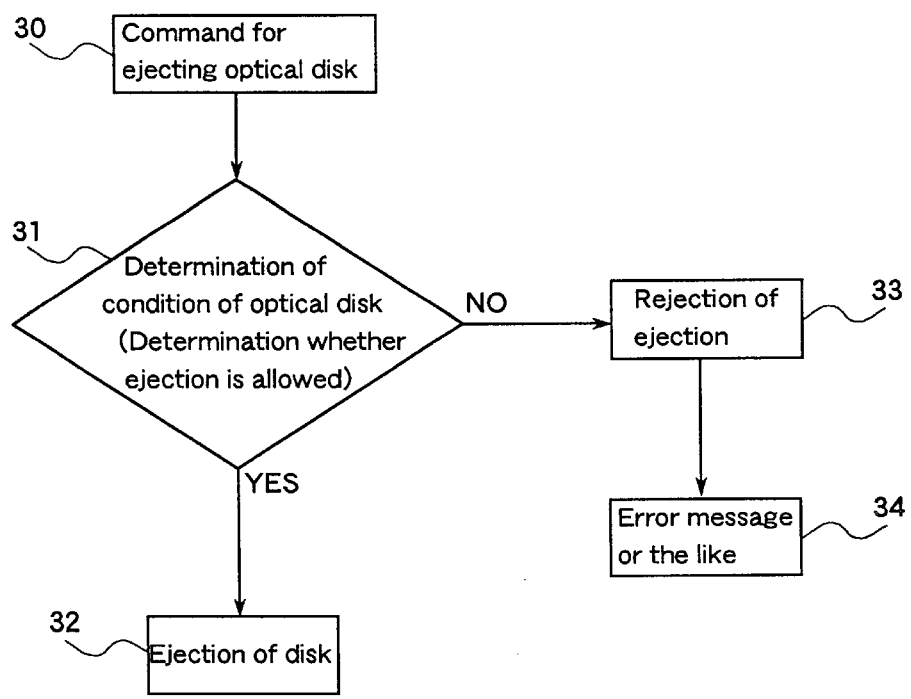
FIG. 3 is a flowchart for explaining an operation of ejecting an optical disk in an optical disk apparatus in Embodiment I of the present invention.

FIG. 3 is a flowchart showing an operation of ejecting an optical disk in an optical disk apparatus according to the present invention.

When a user requests ejection of an optical disk in the optical disk drive 21 or in the changer 22 to the outside (step 30) by a method such as pushing a switch or an operation of a remote control, which is omitted in FIG. 1, the optical disk apparatus 20 determines whether the optical disk may be ejected (carried out) (step 31). In this case, the optical disk apparatus 20 allows the optical disk to be ejected only when judging that the ejection is allowed (YES), and then ejects the optical disk so as to bring it in a condition in which a user can take out the optical disk to the outside (step 32). When judging that the ejection is not allowed (NO), the optical disk apparatus 20 rejects the ejection of the optical disk (step 33), and it is preferable that by an error message (in this case, the optical disk apparatus 20 also has a display unit, which is not shown in the figure) or an alarm (in this case, the optical disk apparatus 20 is provided with a speaker or the like, which is not shown in the figure), and the optical disk apparatus 20 notifies a user that the ejection is not allowed (step 34).

Figure 4:
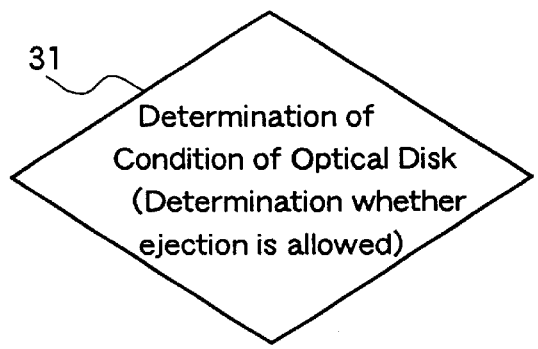
FIG. 4 shows criteria for the judgement in the flowchart in FIG. 3.

FIG. 4 shows some concrete criteria for the judgement in the determination of whether the ejection is allowed or not (step 31) based on the condition of the optical disk in the flowchart shown in FIG. 3. The criteria will be explained as follows.

Embodiment I-1

In determining the condition of an optical disk (in determining whether ejection of the optical disk is allowed or not) in Embodiment I-1, when the optical disk requested to be ejected is a recordable optical disk, the optical disk apparatus judges that the ejection is not allowed (NO). On the other hand, when the optical disk requested to be ejected is a disk used exclusively for reproduction, the optical disk apparatus judges that the ejection is allowed (YES).

In this case, whether the optical disk to be an object is the recordable optical disk or the disk used exclusively for reproduction may be determined, for example, by evaluating an optical disk contained in a cartridge as a recordable optical disk or by evaluating the optical disk based on a signal obtained from the optical head device 10.

In the case of evaluating the optical disk by the signal from the optical head device 10, for example, a disk having a lower signal strength than a certain value or a disk having a low amplitude ratio (modulation factor) of a high-frequency signal for the time-averaged signal strength may be evaluated as a recordable optical disk, or the kind of the disk may be determined from the characteristics of a focus control signal when an objective lens provided in the optical head unit 10 is moved without focus control or from the combination of these methods.

According to the present embodiment, a user can record information on a recordable optical disk and can enjoy the information personally. At the same time, since ejection of a recordable optical disk is not allowed in any case, the copyright holder can protect the copyright without taking any countermeasures.

Embodiment I-2

In determining the condition of an optical disk (in determining whether ejection of an optical disk is allowed or not) in Embodiment I-2, when information has been recorded on an optical disk, for example, by introducing the information from the outside through the information signal input/output part 24, a recording history indicating that the information has been recorded on the optical disk is recorded in a nonvolatile memory (not shown in FIG. 1) inside the optical disk apparatus 20.

On the other hand, when receiving a command for ejecting an optical disk, the optical disk apparatus 20 checks the recording history relating to the optical disk in the memory. Then, the optical disk apparatus 20 judges that the ejection is not allowed (NO) when the recording history indicating that information has been recorded on the optical disk is found and judges that the ejection is allowed (YES) when such recording history is not found.

In this case, the recording history can be stored separately for each optical disk, for example, by providing a memory/memories for recording respective recording history corresponding to each number of places in the changer 22 where optical disks are stored.

According to the present embodiment, a user can record information on a recordable optical disk and can enjoy the information personally. At the same time, an optical disk on which nothing has been recorded can be ejected, and therefore, for example, the optical disk can be replaced with an optical disk with a different capacity. However, once information has been recorded on the optical disk, the ejection of the optical disk is not allowed. Thus, the copyright holder can protect the copyright without taking any countermeasures.

Embodiment I-3

The determination of the condition of an optical disk (the determination whether ejection of an optical disk is allowed or not) in Embodiment I-3 is explained as follows.

When information is recorded on an optical disk, for example, by introducing the information from the outside through the information signal input/output part 24, the optical disk apparatus 20 judges whether a signal indicating that copyright protection of the information is required (hereafter also referred to as "a copyright protection signal") has been added to the information to be recorded (for example, music information, picture (video) information, database information, or the like; hereafter also referred to as "contents information"). When the signal has not been added, the contents information is recorded on the optical disk without extra operation. On the other hand, when the signal has been added, the contents information is recorded on the optical disk, and the recording history indicating that the information whose copyright must be protected (hereafter also referred to simply as "information subject to copyright protection") has been recorded on the optical disk also is recorded in a nonvolatile memory (not shown in FIG. 1) inside the optical disk apparatus 20.

When receiving a command for ejecting an optical disk, the optical disk apparatus 20 checks the recording history relating to the optical disk in the memory. Then, the optical disk apparatus 20 judges that the ejection is not allowed (NO) when the recording history indicating that information subject to copyright protection has been recorded on the optical disk is found and judges that the ejection is allowed (YES) when such recording history is not found.

In this case, the recording history can be stored separately for each optical disk, for example, by providing a memory/memories for recording respective recording history corresponding to each number of places in the changer 22 where optical disks are stored.

In addition, a sender of the information can judge individually whether the copyright of the information must be protected. When the sender judges that the copyright of the information must be protected, the sender may add a copyright protection signal to the information according to a predetermined rule. For instance, when information subject to copyright protection is recorded on an optical disk to be sent, a copyright protection signal may be added by providing physical characteristics such that, for example, reflectance of an information recording surface of the optical disk is decreased extremely only at a specific part. Alternatively, when information subject to copyright protection is transmitted through a radio link such as in satellite broadcasting, by using a specific frequency or channel number the transmitted contents information can be identified as the information subject to copyright protection (in this case, the use of the specific frequency or channel number corresponds to the addition of a copyright protection signal).

According to the present embodiment, a user can record information (information subject to copyright protection) on a recordable optical disk and can enjoy the information personally. In addition, information whose copyright need not be protected, for example, private video images taped by a user himself/herself can be freely copied and/or edited on an optical disk to be given to other people. On the other hand, when a sender of information wishes to protect the copyright of the information, the sender is required only to add a copyright protection signal to the information and send it, thereby inhibiting the ejection of the optical disk on which the information has been recorded. Therefore, the copyright holder can-protect the copyright without taking any countermeasures after sending the information.

Embodiment I-4

In the present embodiment, in the above-mentioned Embodiment I-3, even in the case where a copyright protection signal relating to contents information to be recorded on an optical disk had been added to the contents information, when the information has not been recorded on an optical disk without any change but has been recorded with its quality being deteriorated below a predetermined level, the optical disk apparatus 20 judges that ejection of the optical disk is allowed (YES) when receiving a command for ejecting it.

For instance, when information has been recorded with its quality being deteriorated, a recording history indicating that information subject to copyright protection has been recorded on an optical disk is not recorded in the memory. Alternatively, a recording history indicating that information has been recorded with its quality being deteriorated is recorded in the memory. When receiving a command for ejecting an optical disk, the optical disk apparatus 20 checks the recording history relating to the optical disk in the memory. Then, the apparatus 20 judges that the ejection of the optical disk is allowed (YES) when no recording history indicating that information subject to copyright protection has been recorded on the optical disk is found or when the recording history indicating that information has been recorded with its quality being deteriorated is found. When the condition of the optical disk does not fall under either of the above-mentioned cases the apparatus 20 judges that the ejection is not allowed (NO).

In the above, deteriorating the quality of information means that in the case of music information or picture information, sound quality or picture quality is deteriorated, for example, by decreasing a sampling rate (a sampling frequency) to limit the frequency band in which the information is recorded to a low range or to eliminate the frequency band that is not important, or by decreasing the number of channel bits of a signal size at a certain time (for example, by converting a 16-bit binary coded signal to a 8-bit signal) to decrease resolution (to narrow the dynamic range). In the case of information such as a database, deteriorating the quality of the information means that, for example, an important part of the information is destroyed.

The difference in level to which the quality of information is deteriorated depends on the method of deteriorating the quality of the information. The level of the deterioration in quality of information at which the apparatus 20 judges that ejection of an optical disk is allowed can be freely set. Thus, when the quality has been deteriorated only a little, the optical disk apparatus 20 judges that the quality substantially has not been deteriorated. Then, the information can be considered still as an object for copyright protection. For example, a sender of information subject to copyright protection can record data indicating the extent to which the quality of the information must be deteriorated in order that the information is considered as a non-object for copyright protection, with a copyright protection signal on an optical disk. In such a case, only when the quality of the information has been deteriorated at least to the extent specified in the recorded data, the optical disk apparatus 20 judges that ejection of the optical disk is allowed. Thus, copyright management as the copyright holder wishes can be realized.

According to the present embodiment, the restriction for transferring information subject to copyright protection copied can be alleviated on condition that the quality of the information is deteriorated suitably, thus allowing copyright protection and convenience in using information to be compatible.

Embodiment I-5

In the present embodiment, even when information to which a copyright protection signal had been added was recorded on an optical disk and the recording history indicating that information subject to copyright protection had been recorded was recorded in the memory according to Embodiment I-3, the apparatus 20 judges that ejection of the optical disk is allowed (YES) when receiving a command for ejecting the optical disk in the case where the quality of the information subject to copyright protection recorded on the optical disk has been deteriorated below a predetermined level after the recording of the information.

For instance, when an operation for deteriorating the quality of information is carried out for an optical disk having a recording history indicating that information subject to copyright protection has been recorded, the recording history is deleted. Alternatively, a recording history indicating that the deterioration of the quality of information has been carried out is recorded in the memory. When receiving a command for ejecting an optical disk, the apparatus 20 checks the recording history relating to the optical disk in the memory. Then, the apparatus 20 judges that the ejection of the optical disk is allowed (YES) when no recording history indicating that information subject to copyright protection has been recorded on the optical disk is found or when the recording history indicating that the deterioration of the quality of information has been carried out is found. When the condition of the optical disk does not fall under either of the above-mentioned cases the apparatus 20 judges that the ejection is not allowed (NO).

In the above, the operation for deteriorating the quality of information means to deteriorate the quality of information by carrying out the operation explained in Embodiment I-4 for contents information recorded on an optical disk. After carrying out such operation, the original information (information before the deterioration of the quality of information) is not found on the optical disk.

Similarly in the present embodiment, the difference in level to which the quality of information is deteriorated depends on the method of deteriorating the quality of the information. The level of the deterioration in quality of information at which the apparatus 20 judges that ejection of an optical disk is allowed can be freely set. Thus, when the quality has been deteriorated only a little, the optical disk apparatus 20 judges that the quality substantially has not been deteriorated. Then, the information can be considered still as an object for copyright protection. As in Embodiment I-4, for example, a sender of information subject to copyright protection can record data indicating the extent to which the quality of the information must be deteriorated in order that the information is considered as a non-object for copyright protection, with a copyright protection signal on an optical disk. In such a case, only when the quality of the information has been deteriorated at least to the extent specified in the recorded data, the optical disk apparatus 20 judges that ejection of the optical disk is allowed. Thus, copyright management as the copyright holder wishes can be realized.

According to the present embodiment, a user can record information (information subject to copyright protection) on a recordable optical disk and can enjoy the information personally. Furthermore, information whose copyright need not be protected, for example, private video images taped by a user himself/herself can be freely copied and/or edited on an optical disk to be given to other people. On the other hand, with respect to the information subject to copyright protection, the restriction for transferring information copied can be alleviated on condition that the quality of the information is deteriorated suitably, thus allowing copyright protection and convenience in using information to be compatible.

Embodiment I-6

In the present embodiment, even when information to which a copyright protection signal had been added has been recorded on an optical disk and history indicating that information subject to copyright protection had been recorded has been recorded in the memory according to Embodiment I-3, the apparatus 20 judges that ejection of the optical disk is allowed (YES) when receiving a command for ejecting the optical disk in the case where reproduction of the information subject to copyright protection is completely inhibited by erasure of the information required for reproducing the information subject to copyright protection recorded on the optical disk (for example, management information or the like recorded on an optical disk, hereafter referred to as "reproduction information").

For instance, when erasure of the reproduction information is carried out for an optical disk having a recording history indicating that information subject to copyright protection has been recorded, the recording history is deleted. Alternatively, a recording history indicating that the erasure of the reproduction information has been carried out is recorded in the memory. When receiving a command for ejecting an optical disk, the apparatus 20 checks the recording history relating to the optical disk in the memory. Then, the apparatus 20 judges that the ejection of the optical disk is allowed (YES) when no recording history indicating that information subject to copyright protection has been recorded on the optical disk is found or when the recording history indicating that the erasure of the reproduction information has been carried out is found. When the condition of the optical disk does not fall under either of the above-mentioned cases the apparatus 20 judges that the ejection is not allowed (NO).

The reproduction information is not always required to be erased completely. Only a part of the reproduction information may be erased as long as the information subject to copyright protection cannot be reproduced.

According to the present embodiment, a user can record information (information subject to copyright protection) on a recordable optical disk and can enjoy the information personally. When information subject to copyright protection and other information (for example, private video images taped by a user himself/herself) have been recorded together on one optical disk, the optical disk can be ejected quickly only by carrying out simple erasure of only the reproduction information of the information subject to copyright protection (not the information subject to copyright protection). For example, when the changer 22 is full, by erasure of only reproduction information of unnecessary information subject to copyright protection, the optical disk in the changer 22 can be replaced with a new optical disk, thus improving operability.

Embodiment I-7

In the present embodiment, even when information to which a copyright protection signal had been added was recorded on an optical disk and a recording history indicating that information subject to copyright protection had been recorded was recorded in the memory according to Embodiment I-3, the apparatus 20 judges that ejection of the optical disk is allowed (YES) when receiving a command for ejecting the optical disk in the case where the entire information subject to copyright protection recorded on the optical disk has been erased.

For instance, when erasure of the entire information subject to copyright protection is carried out for an optical disk having a recording history indicating that information subject to copyright protection has been recorded, the recording history is deleted. When receiving a command for ejecting an optical disk, the apparatus 20 checks the recording history relating to the optical disk in the memory. Then, the apparatus 20 judges that the ejection of the optical disk is allowed (YES) when no recording history indicating that information subject to copyright protection has been recorded on the optical disk is found. When the condition of the optical disk does not fall under the above-mentioned case, the apparatus 20 judges that the ejection is not allowed (NO).

According to the present embodiment, a user can record information (information subject to copyright protection) on a recordable optical disk and can enjoy the information personally. When the information subject to copyright protection and other information (for example, private video images taped by a user himself/herself) have been recorded together on one optical disk, the optical disk can be ejected by erasure of the information subject to copyright protection. For example, when the changer 22 is full, by erasure of unnecessary information subject to copyright protection, the optical disk in the changer 22 can be replaced with a new optical disk.

The aforementioned Embodiments I-2 to I-7, which are different from Embodiment I-I, also have an effect in which even when an optical disk is a recordable disk, the optical disk can be replaced with one having a different capacity on condition that nothing has been recorded on the optical disk.

It is preferable that the information recording/reproducing apparatus of the present invention is provided with a changer as in the optical disk apparatus 20 shown in FIG. 1. When the changer is provided, mass information can be used and applied for personal hobby by exchange of information media inside an apparatus even in the case where the information media are not allowed to be ejected to the outside of the apparatus due to the handling of information subject to copyright protection.

The aforementioned Embodiments I-1 to I-7 were explained using an optical disk as an example. However, the present invention also can be applied to other recording media such as a removable hard disk, a floppy disk, or a magnetic tape. For example, when using a hard disk, the above-mentioned changer may be replaced with a plurality of hard disk connections. When unloading is not allowed, the hard disk may be locked so as not to be released from the connections instead of rejecting ejection in the case of an optical disk. When the unloading is allowed, the lock can be unlocked.

Embodiment II

In the present embodiment, when information subject to copyright protection is recorded on an optical disk, information (apparatus information) functioning as a key also is recorded on the optical disk. The information (apparatus information) functioning as a key enables an information recording/reproducing apparatus used for recording to be specified or recognized. On the other hand, to an information reproducing apparatus (including an apparatus used exclusively for reproduction and not for recording) in which contents information recorded on an optical disk is reproduced, information (apparatus information) functioning as a key that enables the apparatus to be specified or recognized is provided. In reproducing contents information recorded on an optical disk in the information reproducing apparatus, when apparatus information has been added to the contents information and the apparatus information is different from that of the information reproducing apparatus, reproduction of the contents information is not allowed.

Thus, when information subject to copyright protection and other information (for example, private video images taped by a user himself/herself) have been recorded together on one optical disk, the optical disk can be ejected from the information recording/reproducing apparatus, and then the contents information other than the information subject to copyright protection can be reproduced in other information reproducing apparatus.

The apparatus information is an identification number, an identification mark, or a cipher that is unique to the information recording/reproducing apparatus or the information reproducing apparatus. Such apparatus information can be recorded in a ROM (Read Only Memory, which is formed of IC in the most cases), in a hologram memory, or in a bar code within the apparatus or can be indicated by the difference in circuit wiring.

Different apparatus information may be provided to each apparatus, or the same apparatus information may be added to a plurality of apparatuses within a certain group. In the former, since information subject to copyright protection can be reproduced only in the apparatus in which the information has been recorded, the copyright can be protected further effectively. In the latter, the information subject to copyright protection can be reproduced only by a plurality of specified users having the apparatuses to which the same apparatus information has been provided.

When an information reproducing apparatus is used exclusively for reproduction, apparatus information may indicate only that the apparatus is used exclusively for reproduction. In other words, not individually different apparatus information but common apparatus information may be provided to apparatuses used exclusively for reproduction. Since only an information recording/reproducing apparatus capable of recording information can record information subject to copyright protection on an optical disk, an apparatus used exclusively for reproduction is inevitably different from the information recording/reproducing apparatus in which the information has been recorded. Therefore, the reproduction of contents information to which apparatus information has been added is always inhibited in an apparatus used exclusively for reproduction. Thus, even if not individual apparatus information but common apparatus information has been provided to apparatuses used exclusively for reproduction, the reproduction of contents information to which apparatus information has been added is inhibited in the apparatuses used exclusively for reproduction in the same way. In addition, the apparatus information can be provided by a simple method (for instance, a method of incorporating IC in which common apparatus information has been recorded into apparatuses used exclusively for reproduction) through providing common apparatus information to apparatuses used exclusively for reproduction. Consequently, apparatuses used exclusively for reproduction to which apparatus information has been provided can be manufactured at low cost.

The apparatus information will be explained more concretely with reference to FIGS. 5–9 as follows.

Embodiment II-1

An operation of recording contents information in the present embodiment will be explained with reference to FIG. 5.

Figure 5:
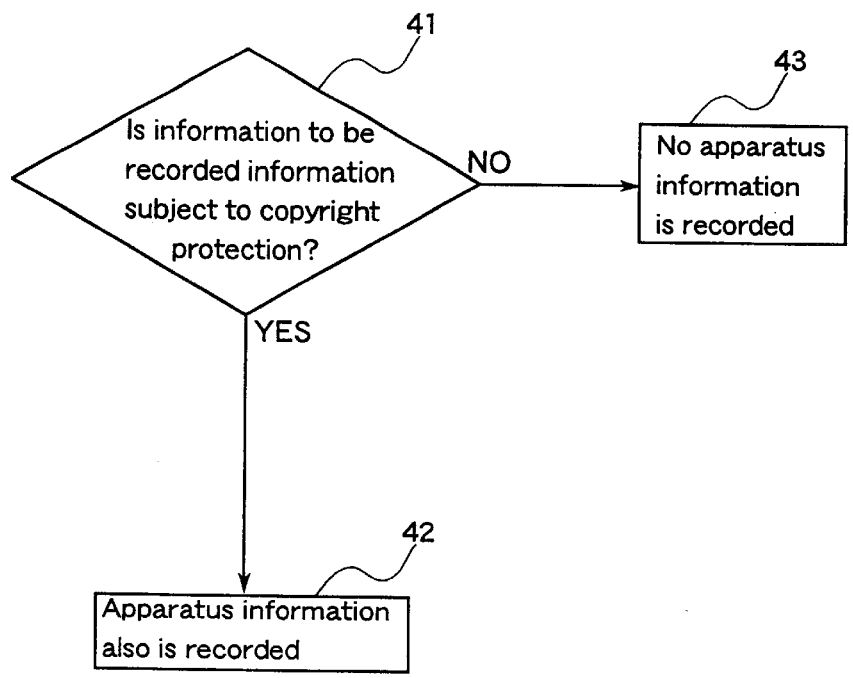
FIG. 5 is a flowchart showing an example of the operation of recording information in an optical disk apparatus in Embodiment II of the present invention.

As shown in FIG. 5, when contents information is recorded on an optical disk, whether the contents information is information whose copyright must be protected (information subject to copyright protection) is judged (step 41). Whether the contents information is information subject to copyright protection can be judged, for example, by judging whether the copyright protection signal explained in Embodiment I-3 has been added to the contents information. In the case of recording the information subject to copyright protection, apparatus information peculiar to an information recording apparatus also is recorded as "key" information in addition to contents information (step 42). On the other hand, in the case of recording information other than the information subject to copyright protection, the apparatus information is not recorded (step 43).

The apparatus information can be recorded in an area (for example, a management area) where information (for example, management information) required for reproduction of contents information recorded on an optical disk is recorded so as to relate to the contents information.

According to the present embodiment, a user can record information (information subject to copyright protection) on a recordable optical disk and can enjoy the information personally using the same apparatus. When information subject to copyright protection is recorded, apparatus information also is recorded and reproduction of the information subject to copyright protection is not allowed in an apparatus having a different apparatus information from the recorded apparatus information. Therefore, when sending information subject to copyright protection, the copyright holder is required only to add a signal indicating that copyright protection is required and can protect the copyright without taking any countermeasures after sending the information.

Embodiment II-2

An operation of recording contents information in the present embodiment will be explained with reference to FIG. 6.

Figure 6:
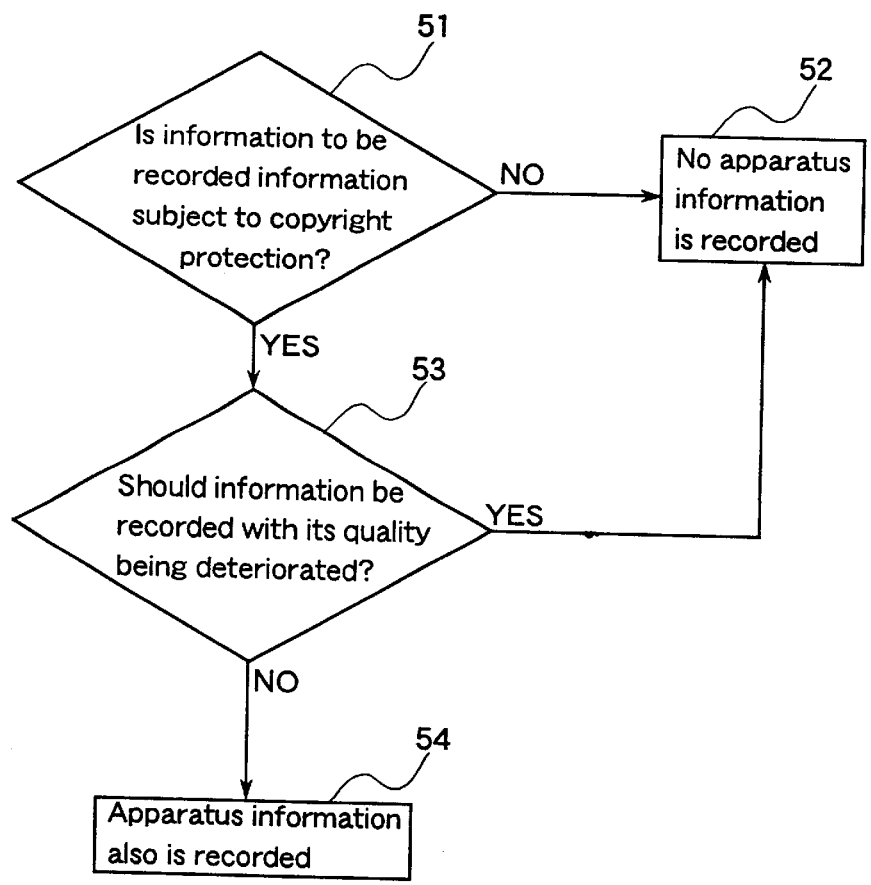
FIG. 6 is a flowchart showing another example of the operation of recording information in the optical disk apparatus in Embodiment II of the present invention.

As shown in FIG. 6, when contents information is recorded on an optical disk, whether the contents information is information subject to copyright protection is judged (step 51). In the case of information other than information subject to copyright protection, apparatus information is not recorded and only the contents information is recorded (step 52). The above is the same in Embodiment II-1.

On the other hand, in the case of information subject to copyright protection, whether the contents information should be recorded with its quality being deteriorated below a predetermined level is considered (step 53). When the contents information is recorded with its quality being deteriorated, apparatus information is not recorded and only the contents information is recorded (step 52). When the information is recorded with its quality not being deteriorated, apparatus information peculiar to an information recording apparatus also is recorded as a "key" information in addition to the contents information (step 54).

In the above, deteriorating the quality of information means to carry out an operation such as explained in the aforementioned Embodiment I-4. The difference in level to which the quality of information is deteriorated depends on the method of deteriorating the quality of the information. In the judgement at step 53, when the quality has not been deteriorated to a sufficient level, the information recording apparatus judges that the quality substantially has not been deteriorated, and then records apparatus information.

As in Embodiment I-4, for example, a sender of information subject to copyright protection can record data indicating the extent to which the quality of the information must be deteriorated in order that the information is considered as a non-object for copyright protection, with a copyright protection signal. In such a case, only when the quality of the information has been deteriorated at least to the extent specified in the recorded data, apparatus information is not recorded. Thus, copyright management as the copyright holder wishes can be realized.

According to the present embodiment, with respect to information subject to copyright protection, information recorded is allowed to be reproduced or copied freely on condition that the quality of the information is deteriorated suitably. Thus, copyright protection and convenience in using information are allowed to be compatible.

In the present embodiment, even if the information recording apparatus judges at step 53 that the quality of information has been deteriorated, apparatus information also may be recorded (step 54) when the regulation for protecting the copyright of the contents information prohibits copying the information even in the case where the quality of the information is deteriorated.

Embodiment II-3

Figure 7:
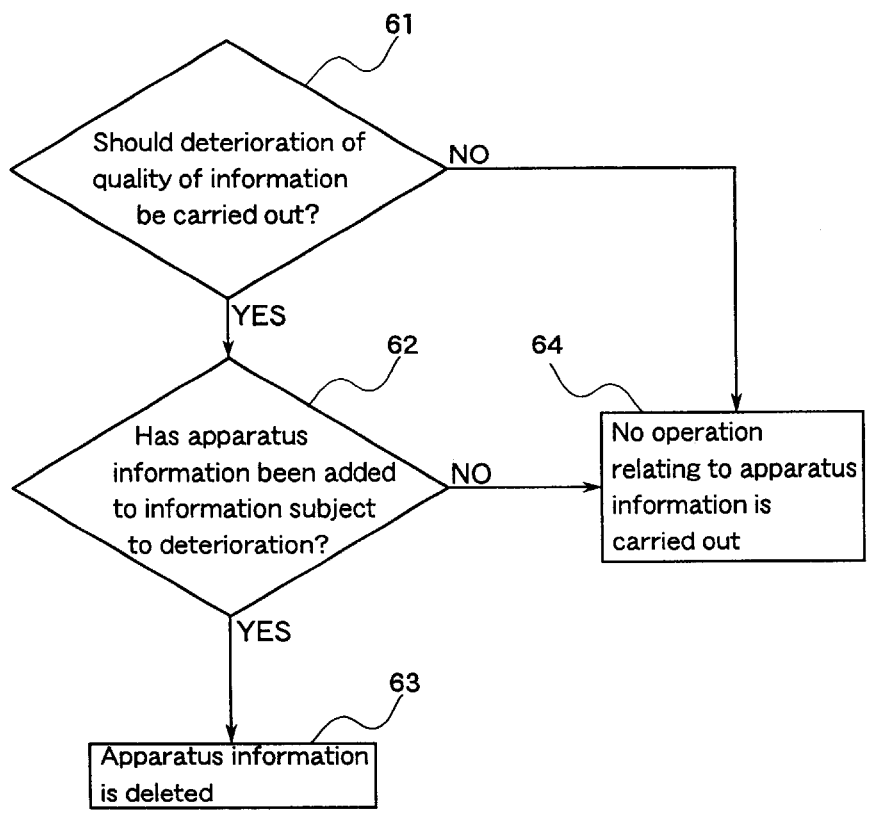
FIG. 7 is a flowchart showing an example of the operation of changing information quality in the optical disk apparatus in Embodiment II of the present invention.

The present embodiment will be explained with reference to FIG. 7.

In the present embodiment, even in the case where apparatus information had been recorded in addition to information subject to copyright protection according to the aforementioned Embodiments II-1 and II-2, the apparatus information is erased when an operation for deteriorating the quality of the information subject to copyright protection recorded on an optical disk below a predetermined level has been carried out after the recording of the information.

In other words, when an operation for deteriorating the quality of contents information recorded on a rewritable-type optical disk is carried out (step 61), whether apparatus information has been added to the contents information subject to the deterioration is judged (step 62). Then, when the apparatus information has been added to the contents information, the apparatus information is deleted (step 63). When the apparatus information has not been added to the contents information, the operation relating to the apparatus information is not carried out (step 64). When the operation for deteriorating the quality of information is not carried out at step 61, of course the operation relating to the apparatus information is not carried out (step 64).

In the above, the operation for deteriorating the quality of information means to carry out an operation such as explained in Embodiment I-4 for contents information recorded on an optical disk to deteriorate the quality of the information. After such an operation has been carried out, the original information (information before the operation for deteriorating the quality of information) is not found on the optical disk.

Similarly in the present embodiment, the difference in level to which the quality of information is deteriorated depends on the method of deteriorating the quality of the information. The level to which the quality of information should be deteriorated to delete apparatus information can be freely set. When quality of information has not been deteriorated to a sufficient level, an apparatus judges that the quality substantially has not been deteriorated. Then, the information can be considered still as an object for copyright protection. As in Embodiment I-4, for example, a sender of information subject to copyright protection can record data indicating the extent to which the quality of the information must be deteriorated in order that the information is considered as a non-object for copyright protection, with a copyright protection signal. In such a case, only when the quality of the information has been deteriorated at least to the extent specified in the recorded data, apparatus information is deleted. Thus, copyright management as the copyright holder wishes can be realized.

According to the present embodiment, even in an information reproducing apparatus having different apparatus information from that recorded on an optical disk, contents information is allowed to be freely reproduced or copied on condition that the quality of the information is deteriorated suitably, thus enabling copyright protection and convenience in using information to be compatible.

Similarly in the present embodiment, even if an apparatus judges that the operation for deteriorating the quality of the information has been carried out at step 61, the operation relating to apparatus information may not be carried out (step 64) when the regulation for protecting the copyright of the contents information prohibits reproducing the information even in the case where the quality of the information is, deteriorated.

Embodiment II-4

A procedure in reproducing contents information recorded on an optical disk will be explained with reference to FIG. 8.

Figure 8:
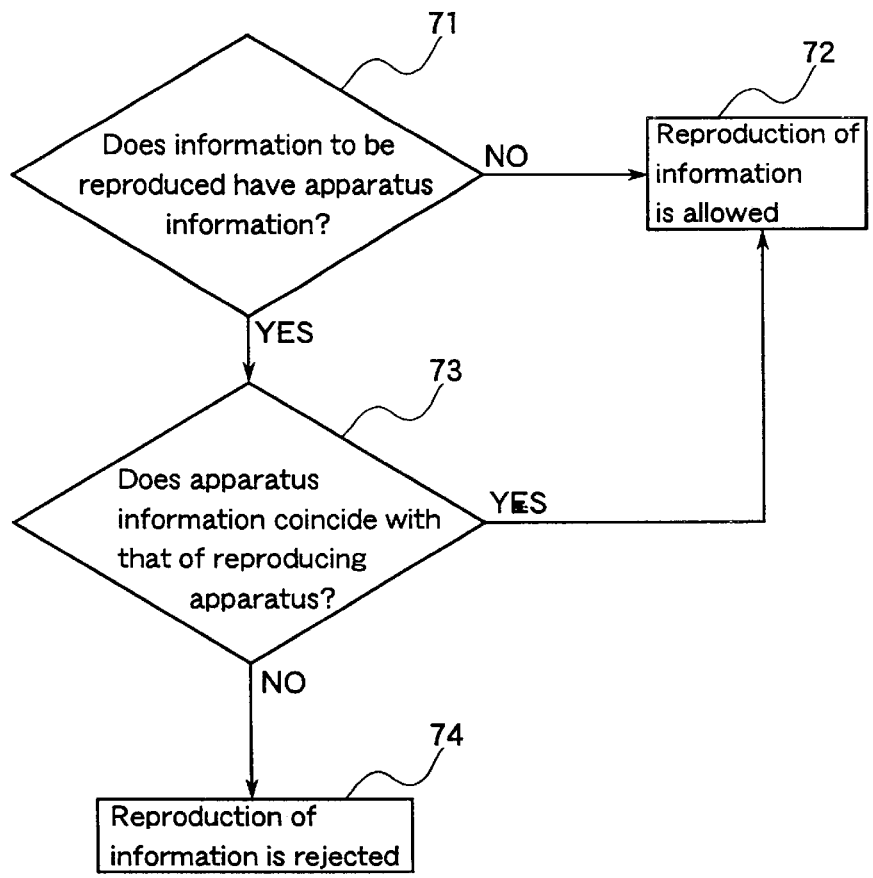
FIG. 8 is a flowchart showing an example of the operation of reproducing information in the optical disk apparatus in Embodiment II of the present invention.

As shown in FIG. 8, in reproducing contents information, first is judged whether apparatus information has been added to the contents information to be reproduced (step 71). When no apparatus information has been added, reproduction of the contents information is allowed (step 72). When apparatus information has been added, whether the apparatus information coincides with that of an information recording/reproducing apparatus or an information reproducing apparatus in which the contents information is reproduced is judged (step 73). When they coincide with each other, the reproduction of the contents information is allowed (step 72). If not, the reproduction is rejected (step 74). In this case, it is preferable that the information recording/reproducing apparatus or the information reproducing apparatus displays that the contents information cannot be reproduced due to copyright protection when the reproduction is rejected.

According to the present embodiment, only by allowing apparatus information to be added to information subject to copyright protection in recording the information, a certain restriction for reproducing and copying information subject to copyright protection can be set. Therefore, the copyright holder can protect the copyright without taking any countermeasures after sending information subject to copyright protection.

Embodiment III

In another method of protecting copyright, when information subject to copyright protection is recorded on an optical disk, information (regional information) functioning as a key also is recorded on the optical disk. The information (regional information) functioning as a key enables the installation region or the installation place of an information recording/reproducing apparatus used for the recording to be specified or recognized. On the other hand, to an information reproducing apparatus (including an apparatus that is used exclusively for reproducing information and not for recording information) in which contents information recorded on an optical disk is reproduced, information (regional information) functioning as a key that enables the region or the place where the information is reproduced to be specified or recognized is provided. When the information reproducing apparatus reproduces contents information recorded on an optical disk, the reproduction of the contents information is not allowed in the case where regional information has been added to the contents information and the regional information is different from that of the information reproducing apparatus.

Thus, when information subject to copyright protection and other information (for example, private video images taped by a user himself/herself) have been recorded together on one optical disk, the optical disk can be ejected from an information recording/reproducing apparatus, and then the contents information other than the information subject to copyright protection can be reproduced in an information reproducing apparatus installed at other place.

The regional information of a recording apparatus and that of a reproducing apparatus can be provided to the apparatuses beforehand by the following methods as examples. For example, by installing an apparatus (equipped with at least an antenna for receiving GPS signals and a GPS signal detector) for receiving GPS information sent from an artificial satellite, which has been widely used for a car navigation system or the like, in an information recording/reproducing apparatus (including an information reproducing apparatus used exclusively for reproduction), the information relating to the current installation place (region) of the information recording/reproducing apparatus obtained from the GPS information is provided to the information recording/reproducing apparatus. This enables easy design of a system allowing reproduction of contents information only when the place where the information is reproduced is the same as the place where the information was recorded (for example, within the same country, within the same region, within the same location, within the same house). Further, instead of the GPS information from an artificial satellite, installation place information of an information recording/reproducing apparatus can be provided to the apparatus using telephone lines or the like. In addition, it may be possible to force a user of an information recording/reproducing apparatus to input the installation place information to the apparatus. Alternatively, a manufacturer or a seller of an information recording/reproducing apparatus also can input the information of the place where the apparatus will be used beforehand.

The procedures in recording regional information on an optical disk, in deleting recorded regional information, and in reproducing contents information recorded on an optical disk can be carried out as in the case of the apparatus information explained in Embodiments II-1 to II-4.

In other words, when information subject to copyright protection is recorded on an optical disk, regional information specifying a recording place also is recorded. This enables a user to record information (information subject to copyright protection) on a recordable optical disk and to enjoy the information personally within the same region. With respect to information subject to copyright protection, regional information is recorded when the information subject to copyright protection is recorded, and the information subject to copyright protection is not allowed to be reproduced in an apparatus having different regional information from that recorded (that is to say, reproduction in the different region from the region where the information was recorded is not allowed). Therefore, the copyright holder can protect the copyright without taking any countermeasures after sending information subject to copyright protection.

Even in the case where information subject to copyright protection is recorded on an optical disk, when the information is recorded with its quality being deteriorated, it is possible to allow regional information not to be recorded. Thus, information subject to copyright protection that has been recorded is allowed to be freely reproduced or copied on condition that the quality of the information is deteriorated suitably, thus enabling copyright protection and convenience in using information to be compatible.

When an operation for deteriorating the quality of information subject to copyright protection has been carried out for an optical disk on which regional information had been recorded in addition to information subject to copyright protection, the regional information may be erased. Consequently, even in a different region from the region where the information subject to copyright protection was recorded, contents information is allowed to be freely reproduced or copied on condition that the quality of the information is deteriorated suitably, thus enabling copyright protection and convenience in using information to be compatible.

Furthermore, the reproduction of contents information, to which regional information has been added, on an optical disk is allowed only when the regional information of the contents information coincides with that of the place where the contents information is reproduced. When they do not coincide with each other, the reproduction is rejected. Therefore, certain restriction for reproduction and copying of information subject to copyright protection can be set only by allowing regional information to be added when information subject to copyright protection is recorded. Thus, the copyright holder can protect the copyright without taking any countermeasures after sending information subject to copyright protection.

The aforementioned Embodiments II and III are explained using an optical disk as an example. However, the present invention can be applied to other recording media such as a removable hard disk, a floppy disk, and a magnetic tape.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An information recording/reproducing apparatus for recording information on an information medium, the information recording/reproducing apparatus comprising, receiver for receiving a command for unloading the information medium to the outside, wherein the information recording/reproducing apparatus determines whether the information medium is to be unloaded, and evaluator for judging whether unloading of the information medium is allowed, wherein only when judging that unloading of the information medium is allowed, the information recording/reproducing apparatus allows the information medium to be unloaded, and when judging that the unloading of the information medium is not allowed, the information recording/reproducing apparatus rejects the unloading of the information medium, wherein when the information medium requested to be unloaded is a recordable medium, the evaluator judges that the unloading of the information medium is not allowed, and when the information medium requested to be unloaded is a medium used exclusively for reproduction, the evaluator judges that the unloading of the information medium is allowed.

2. The information recording/reproducing apparatus according to claim 1, wherein when the evaluator judges that the unloading of the information medium is not allowed, the information recording/reproducing apparatus rejects the unloading and also informs a user that the unloading is not allowed by an error message or an alarm.

3. The information recording/reproducing apparatus according to claim 1, wherein the information medium is an optical disk and the information recording/reproducing apparatus comprises an optical disk drive.

4. The information recording/reproducing apparatus according to claim 1, wherein the information recording/reproducing apparatus comprises a changer for the information medium.

5. The information recording/reproducing apparatus according to claim 1, wherein the information medium is a removable hard disk.

6. An information recording/reproducing apparatus for recording information on an information medium, receiver for receiving a command for unloading the information medium to the outside, wherein the information recording/reproducing apparatus determines whether the information medium is to be unloaded, evaluator for judging whether unloading of the information medium is allowed, wherein only when judging that unloading of the information medium is allowed, the information recording/reproducing apparatus allows the information medium to be unloaded, and when judging that the unloading of the information medium is not allowed, the information recording/reproducing apparatus rejects the unloading of the information medium, and a memory for storing history relating to recording of information on the information medium, wherein when recording information on the information medium, the information recording/reproducing apparatus records in the memory the fact that the information has been recorded on the information medium, and when receiving a command for unloading the information medium to the outside, in the case where a history indicating that information has been recorded on the information medium requested to be unloaded is found in the memory, the evaluator judges that the unloading of the information medium is not allowed, and in the case where the history is not found, the evaluator judges that the unloading of the information medium is allowed.

7. The information recording/reproducing apparatus according to claim 6, wherein when the evaluator judges that the unloading of the information medium is not allowed, the information recording/reproducing apparatus rejects the unloading and also informs a user that the unloading is not allowed by an error message or an alarm.

8. The information recording/reproducing apparatus according to claim 6, wherein the information medium is an optical disk and the information recording/reproducing apparatus comprises an optical disk drive.

9. The information recording/reproducing apparatus according to claim 6, wherein the information recording/reproducing apparatus comprises a changer for the information medium.

10. The information recording/reproducing apparatus according to claim 6, wherein the information medium is a removable hard disk.

11. An information recording/reproducing apparatus for recording information on an information medium, receiver for receiving a command for unloading the information medium to the outside, wherein the information recording/reproducing apparatus determines whether the information medium is to be unloaded, evaluator for judging whether unloading of the information medium is allowed, wherein only when judging that unloading of the information medium is allowed, the information recording/reproducing apparatus allows the information medium to be unloaded, and when judging that the unloading of the information medium is not allowed, the information recording/reproducing apparatus rejects the unloading of the information medium, and a memory for storing history relating to recording of information on the information medium, wherein when information to which a signal indicating that copyright protection is required had been added has been recorded on the information medium, the information recording/reproducing apparatus records in the memory the fact that information whose copyright is to be protected has been recorded on the information medium, and when receiving a command for unloading the information medium to the outside, in the case where history indicating that information whose copyright is to be protected has been recorded on the information medium requested to be unloaded is found in the memory, the evaluator judges that the unloading of the information medium is not allowed, and in the case where the history is not found, the evaluator judges that the unloading of the information medium is allowed.

12. The information recording/reproducing apparatus according to claim 11, wherein even when information to which a signal indicating that copyright protection is required had been added has been recorded on the information medium, in the case where the information has been recorded on the information medium with its quality being deteriorated, the evaluator judges that the unloading of the information medium is allowed when receiving a command for unloading the information medium to the outside.

13. The information recording/reproducing apparatus according to claim 11, wherein even when information to which a signal indicating that copyright protection is required had been added was recorded on the information medium and the fact that information whose copyright is to be protected had been recorded on the information medium was recorded in the memory, in the case where an operation for deteriorating quality of the information recorded on the information medium has been carried out, the evaluator judges that the unloading of the information medium is allowed when receiving a command for unloading the information medium to the outside.

14. The information recording/reproducing apparatus according to claim 11, wherein even when information to which a signal indicating that copyright protection is required had been added was recorded on the information medium and the fact that information whose copyright is to be protected had been recorded on the information medium was recorded in the memory, in the case where information required for reproducing the information has been erased from the information medium, the evaluator judges that the unloading of the information medium is allowed when receiving a command for unloading the information medium to the outside.

15. The information recording/reproducing apparatus according to claim 11, wherein even when information to which a signal indicating that copyright protection is required had been added was recorded on the information medium and the fact that information whose copyright is to be protected had been recorded on the information medium was recorded in the memory, in the case where all the information recorded on the information medium has been erased, the evaluator judges that the unloading of the information medium is allowed when receiving a command for unloading the information medium to the outside.

16. The information recording/reproducing apparatus according to claim 11, wherein when the evaluator judges that the unloading of the information medium is not allowed, the information recording/reproducing apparatus rejects the unloading and also informs a user that the unloading is not allowed by an error message or an alarm.

17. The information recording/reproducing apparatus according to claim 11,
wherein the information medium is an optical disk and the information recording/reproducing apparatus comprises an optical disk drive.

18. The information recording/reproducing apparatus according to claim 11,
wherein the information recording/reproducing apparatus comprises a changer for the information medium.

19. The information recording/reproducing apparatus according to claim 11, wherein the information medium is a removable hard disk.

* * * * *